F. JOHNSON.
COMBINATION REFUSE CAN AND FLY TRAP.
APPLICATION FILED JULY 20, 1917.
1,244,859.
Patented Oct. 30, 1917.
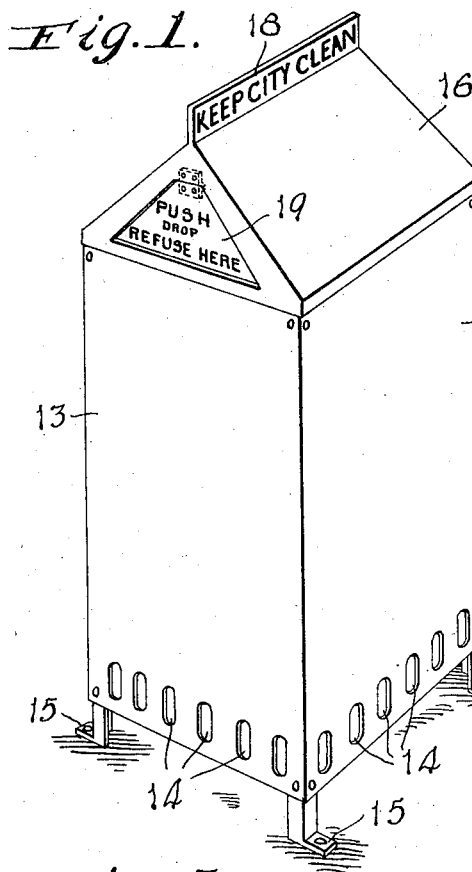
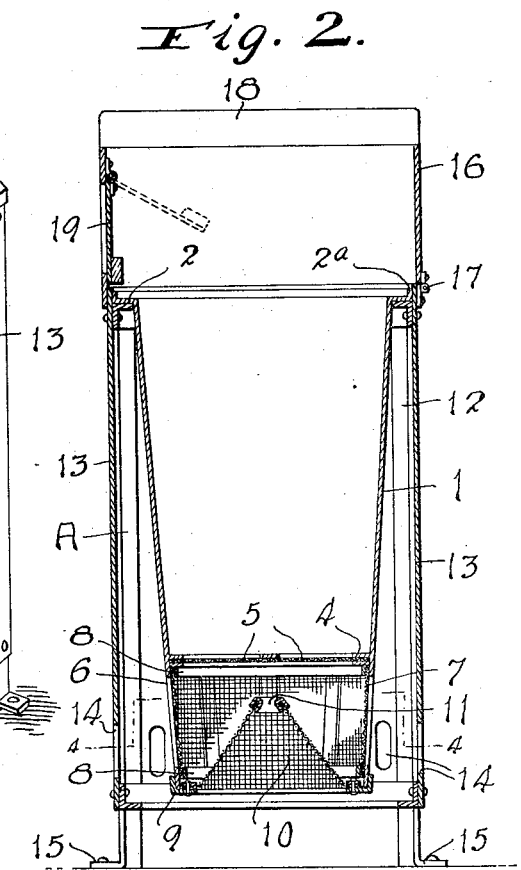
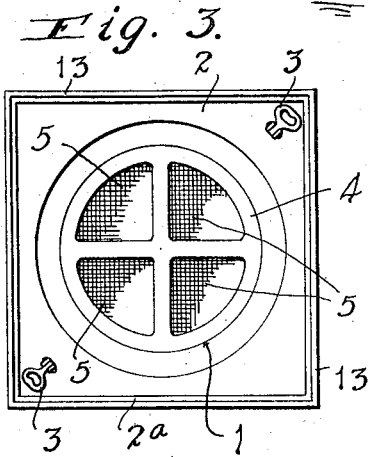
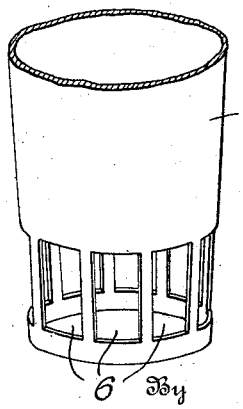
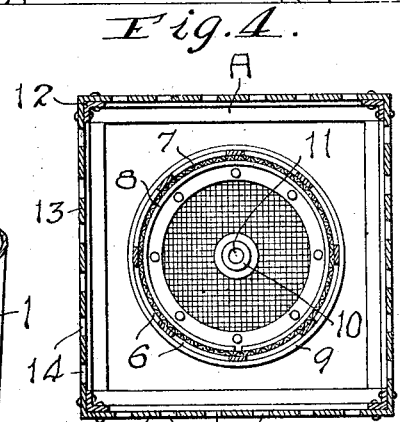
Inventor
FLOYD JOHNSON
Attorney

UNITED STATES PATENT OFFICE.

FLOYD JOHNSON, OF EVANSVILLE, INDIANA, ASSIGNOR OF ONE-HALF TO RAYMOND N. LANNERT, OF EVANSVILLE, INDIANA.

COMBINATION REFUSE-CAN AND FLY-TRAP.

1,244,859.  Specification of Letters Patent.  Patented Oct. 30, 1917.

Application filed July 20, 1917. Serial No. 181,769.

*To all whom it may concern:*

Be it known that I, FLOYD JOHNSON, a citizen of the United States, residing at Evansville, in the county of Vanderburg, State of Indiana, have invented a new and useful Combination Refuse-Can and Fly-Trap; and I do hereby declare the following to be a full, clear, and exact description of the invention, such as will enable others skilled in the art to which it appertains to make and use the same.

The present invention relates to a combination refuse can and fly trap, and has for its object to provide a device of this character which embodies novel features of construction whereby a sanitary container is provided for the reception of refuse, the bottom of the container being in the form of a trap for catching any flies which may be attracted by the refuse.

Further objects of the invention are to provide a combination refuse can and fly trap which is comparatively simple and inexpensive in its construction, which provides a handy container for refuse, which admits of the refuse being readily removed, and which provides an effective means for catching any flies which may be attracted by the refuse.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which—

Figure 1 is a perspective view of a combination refuse container and fly trap constructed in accordance with the invention.

Fig. 2 is a vertical longitudinal sectional view through the device.

Fig. 3 is a top plan view of the supporting stand and refuse container, the cover being removed.

Fig. 4 is a horizontal sectional view on the line 4—4 of Fig. 2.

Fig. 5 is a detail perspective view of the lower end of the upright casing.

Corresponding and like parts are referred to in the following description and indicated in all the views of the drawings by the same reference characters.

Referring to the drawings, which illustrate one embodiment of the invention, the numeral 1 designates an upright casing, preferably cylindrical in shape, and provided at its open upper end with a plate 2, said plate being preferably reinforced at its edges, as indicated at 2ª, and being adapted to rest loosely upon the upper end of a stand A. A pair of handles 3 are applied to the plate 2 for enabling a firm hold to be obtained upon the same when it is desired to lift the casing 1 from the stand for the purpose of discharging the contents therefrom.

The upright cylindrical casing 1 is provided at a point spaced from the lower end thereof with a bottom 4, said bottom subdividing the casing into an upper refuse receiving compartment and a lower fly trap compartment. This bottom 4 is shown as having a series of segmental openings cut therein, woven wire meshing 5 being stretched across the said openings so as to support the refuse and at the same time permit polluted and charged air to circulate downwardly into the fly trap. The sides of the casing 1 below the bottom 4 are cut away at 6 to provide a skeleton frame, wire meshing 7 being arranged within the skeleton frame to close the cut-away portions 6. This wire meshing 7 may be conveniently held in position by means of a pair of retaining bands 8 which are slipped within the lower end of the casing 1 and engage the upper and lower edges of the wire meshing 7 to hold it in position. A flanged ring 9 is fitted removably upon the lower end of the casing 1 and provided with a cone 10 formed of wire meshing and having an entrance opening 11 at the apex thereof. With this construction it will be obvious that any flies which may be attracted by the odors circulating downwardly from the refuse through the perforated bottom 4 of the refuse container, will eventually enter the trap chamber through the opening 11 at the apex of the cone 10. The construction thus provides an effective fly trap as well as an inexpensive and sanitary refuse container.

The stand A may include a rectangular frame 12 of angle iron or the like, side plates 13 being applied to the frame to close the sides of the stand. These side plates 13 terminate short of the bottom of the frame 12, and are provided in their lower portions with openings 14 which admit light to the fly trap and also provide convenient entrances for the flies. The corner uprights of the frame 12 extend downwardly below the side plates 13 to support the entire device in an elevated position, said uprights being shown as provided at the lower ends with feet 15 by means of which the device can be secured permanently in position, if desired.

A cover 16 is hinged at 17 to one of the upper edges of the stand A, said cover being shown as having the shape of a triangular prism, and being adapted to provide a closure for the refuse container. An appropriate sign 18 may extend along the ridge of the cover, while one of the vertical ends of the cover may be provided with an entrance opening, said opening being normally closed by a door 19 which is loosely hinged at its upper edge and drops into a closed position by the action of gravity. This door can be readily swung inwardly when it is desired to deposit refuse in the container, although it will swing back into a closed position as soon as released, thereby serving to prevent the escape of odors through the top of the casing and also excluding flies from the top of the casing. Any odors which there may be will escape through the bottom of the container and serve to lure any flies which may be attracted thereby into the fly trap.

Having thus described the invention, what I claim as new and desire to secure by Letters Patent, is:—

1. A combination refuse can and fly trap including an upright casing provided with a bottom which is spaced from the lower end thereof, the sides of the casing between the bottom and the lower end thereof being cut away to provide a skeleton formation, screening applied to the cut away portions of the sides, and a cone extending upwardly into the lower end of the casing and having an inlet opening at the apex thereof.

2. A combination refuse can and fly trap including an upright casing provided with a bottom which is spaced from the lower end thereof, said bottom having openings therein and the sides of the casing between the bottom and the lower end thereof being cut away to provide a skeleton formation, screening applied to the openings in the bottom, screening applied to the cut away portions of the side, and a cone extending upwardly into the lower end of the casing and having an inlet opening at the apex thereof.

3. A combination refuse can and fly trap including an upright casing provided with a bottom which is spaced from the lower end thereof, said bottom having openings therein and the sides of the casing between the bottom and the lower end thereof being cut away to provide a skeleton formation, screening applied to the cut away portions of the sides, a flanged ring fitted removably within the lower end of the casing, and a cone carried by the flanged ring, said cone projecting upwardly into the casing and having an inlet opening at the apex thereof.

4. A combination refuse can and fly trap including an upright casing provided with a bottom which is spaced from the lower end thereof, the sides of the casing between the bottom and the lower end thereof being cut away to provide a skeleton formation, screening applied to the cut away portions of the sides, a cone projecting upwardly into the lower end of the casing and having an inlet opening at the apex thereof, a plate applied to the upper end of the casing, a frame receiving the casing and engaging the plate to support the casing in an elevated position, side plates applied to the frame and provided at the lower portions thereof with openings located substantially opposite the trap, and a cover mounted upon the frame and arranged to close the upper end of the casing.

In testimony whereof I have signed my name to this specification in the presence of two subscribing witnesses.

FLOYD JOHNSON.

Witnesses:
OLLIE BAKER,
BEN. J. SCHUTTLER.

Copies of this patent may be obtained for five cents each, by addressing the "Commissioner of Patents, Washington, D. C."